(12) United States Patent
Burton, Jr.

(10) Patent No.: US 7,682,599 B2
(45) Date of Patent: *Mar. 23, 2010

(54) METHOD FOR PREPARING NES-TYPE ZEOLITES USING NOVEL STRUCTURE DIRECTING AGENTS

(75) Inventor: Allen W. Burton, Jr., Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/249,767

(22) Filed: Oct. 10, 2008

(65) Prior Publication Data

US 2009/0060834 A1 Mar. 5, 2009

(51) Int. Cl.
*C01B 39/00* (2006.01)
*C01B 39/02* (2006.01)
*B01J 21/06* (2006.01)

(52) U.S. Cl. .................. 423/704; 423/701; 423/718; 502/100

(58) Field of Classification Search ......... 423/701, 423/704; 502/100; *C01B 39/06; B01J 21/06*
See application file for complete search history.

(56) References Cited

U.S. PATENT DOCUMENTS

| | | | |
|---|---|---|---|
| 5,041,402 A | 8/1991 | Casci et al. | |
| 5,102,641 A | 4/1992 | Casci et al. | |
| 5,178,748 A | 1/1993 | Casci et al. | |
| 5,345,021 A | 9/1994 | Casci et al. | |
| 2008/0050308 A1* | 2/2008 | Vermeiren et al. | .......... 423/704 |

FOREIGN PATENT DOCUMENTS

WO  WO 2005/097679  * 10/2005

OTHER PUBLICATIONS

STIC search.*
Cabans et l., Zeolite syntheses using linear diquats of varying length in fluoride media. The snthesis of ITQ-8, ITQ-10, ITQ-10, ITQ-14 and high silica Nu-87, Journal of Materials Chemistry, 2002, 249-257, 12, RSCPublishing.
Baerlocher et al., NES Framework Datasheet, Atlas of Zeolite Framework Types, vol. $6^{th}$ Ed, 2007, p. 240-241, Elsevier.
Casci et al., Template design for high-silica zeotypes: A case study of zeolite NES synthesis using a designed template, Studies in Surface Scienc and Catalysis, 2004, p. 110-117, vol. 1554, Elsevier B.V.

* cited by examiner

*Primary Examiner*—Roy King
*Assistant Examiner*—Alexander Polyansky
(74) *Attorney, Agent, or Firm*—Michael D. Ross (57) ABSTRACT

The present invention is directed to a process for preparing NES-type zeolites using novel nitrogen-based structure directing agents. The structure directing agents used in preparing NES-type zeolites selected from the group consisting of 1,4-bis(N,N-dimethylcyclohexylammonium) butane dications and 1,5-bis(N,N-dimethylcyclohexylammonium) pentane dications.

10 Claims, 5 Drawing Sheets

METHOD FOR PREPARING NES-TYPE ZEOLITES USING NOVEL STRUCTURE DIRECTING AGENTS

FIELD OF THE INVENTION

The present invention is directed to a process for preparing NES-type zeolites using novel nitrogen-based structure directing agents ("SDA").

BACKGROUND OF THE INVENTION

Zeolites having the NES framework topology defined by the connectivity of the tetrahedral atoms are known. See, for example, Ch. Baerlocher et al., *Atlas of Zeolite Framework Types*, 6th Revised Edition, 2007 of the International Zeolite Association. An example of an NES-type zeolite includes the zeolite designated "Nu-87." U.S. Pat. Nos. 5,041,402; 5,102,641; 5,178,748 and 5,345,021, all to Casci et al., disclose Nu-87.

It has now been found that NES-type zeolites can be prepared using 1,4-bis(N,N-dimethylcyclohexylammonium)butane dications and 1,5-bis(N,N-dimethylcyclohexylammonium)pentane dications as SDAs.

SUMMARY OF THE INVENTION

In accordance with the present invention, there is provided a process for preparing NES-type zeolites by:

(a) preparing a reaction mixture containing (1) at least one active source of an oxide selected from the group consisting of oxides of silicon, germanium, and a mixture thereof; (2) at least one active source of an oxide selected from the group consisting of oxides of aluminum, boron, iron, gallium, and mixtures thereof; (3) at least one active source of an element selected from Groups 1 and 2 of the Periodic Table; (4) hydroxide ions; (5) a SDA dication selected from the group consisting of the following SDA dications:

1,4-bis(N,N-dimethylcyclohexylammonium)butane dication 1,5-bis(N,N-dimethylcyclohexylammonium)pentane dication and (6) water; and (b) maintaining the reaction mixture under conditions sufficient to form crystals of the zeolite.

Where the zeolite formed is an intermediate zeolite, the process of the present invention includes a further step of synthesizing a target zeolite by post-synthesis techniques, such as heteroatom lattice substitution techniques and acid leaching.

The present invention also provides NES-type zeolites made by the process of the present invention whose composition, as-synthesized and in the anhydrous state, in terms of mole ratios, is as follows:

| | |
|---|---|
| $YO_2/W_2O_3$ | 20-200 |
| $Q/YO_2$ | 0.015-0.05 |
| $M/YO_2$ | 0-0.04 | wherein:

(1) Y is selected from the group consisting of silicon (Si), germanium (Ge), and a mixture thereof;

(2) W is selected from the group consisting of oxides of aluminum (Al), boron (B), iron (Fe), gallium (Ga), and mixtures thereof;

(3) M is selected from the group consisting of elements from Groups 1 and 2 of the Periodic Table; and (4) Q is an SDA selected from the group consisting of 1,4-bis(N,N-dimethylcyclohexylammonium)butane dications and 1,5-bis(N,N-dimethylcyclohexylammonium)pentane dications.

DETAILED DESCRIPTION OF THE INVENTION

Introduction

The term "active source" means a reagent or precursor material capable of supplying an element in a form that can react and be incorporated into the zeolite structure. The terms "source" and "active source" are used interchangeably herein.

The term "Periodic Table" refers to the version of IUPAC Periodic Table of the Elements dated Jun. 22, 2007, and the numbering scheme for the Periodic Table Groups is as described in Chemical and Engineering News, 63(5), 27 (1985).

The term "zeolite" includes (a) intermediate and (b) final or target zeolites produced by (1) direct synthesis or (2) post-crystallization treatment (secondary synthesis). Secondary synthesis techniques allow for the synthesis of a target zeolite from an intermediate zeolite using techniques such as heteroatom lattice substitution techniques and acid leaching. For example, an aluminosilicate can be synthesized from an intermediate borosilicate by post-crystallization heteroatom lattice substitution of the Al for B. Such techniques are known, for example as described in U.S. Pat. No. 6,790,433 to C. Y. Chen and Stacey Zones, issued Sep. 14, 2004.

Where permitted, all publications, patents and patent applications cited in this application are herein incorporated by reference in their entirety, to the extent such disclosure is not inconsistent with the present invention.

Unless otherwise specified, the recitation of a genus of elements, materials or other components, from which an individual component or mixture of components can be selected, is intended to include all possible sub-generic combinations of the listed components and mixtures thereof. Also, "include" and its variants, are intended to be non-limiting, such that recitation of items in a list is not to the exclusion of other like items that may also be useful in the materials, compositions and methods of this invention.

Reaction Mixture

In accordance with the present invention, there is provided a process for preparing NES-type zeolites by:

(a) preparing a reaction mixture containing (1) at least one active source of an oxide selected from the group consisting of oxides of silicon, germanium, and a mixture thereof; (2) at least one active source of an oxide selected from the group consisting of oxides of aluminum, boron, iron, gallium, and mixtures thereof; (3) at least one active source of an element selected from Groups 1 and 2 of the Periodic Table; (4) hydroxide ions; (5) a SDA selected from the group consisting of SDA dications represented by the following structures (1) and (2):

1,4-bis(N,N-dimethylcyclohexylammonium)butane dication 1,5-bis(N,N-dimethylcyclohexylammonium)pentane dication and (6) water; and (b) maintaining the reaction mixture under conditions sufficient to form crystals of the zeolite.

Where the zeolite formed is an intermediate zeolite, the process of the present invention includes a further step of synthesizing a target zeolite by secondary synthesis techniques, such as heteroatom lattice substitution techniques and acid leaching.

The composition of the reaction mixture from which the zeolite is formed, in terms of molar ratios, is identified in Table 1 below, wherein compositional variables Y, W, Q and M are as described herein above.

TABLE 1

| Reactants | Broad | Preferred |
|---|---|---|
| $YO_2/W_2O_3$ molar ratio | 8-200 | 10-80 |
| $M/YO_2$ molar ratio | 0.05-0.50 | 0.05-0.30 |
| $Q/YO_2$ molar ratio | 0.05-0.50 | 0.10-0.25 |
| $OH/YO_2$ molar ratio | 0.10-1.0 | 0.20-0.40 |
| $H_2O/YO_2$ molar ratio | 10-200 | 20-60 |

Sources useful herein for Si include fumed silica, precipitated silicates, silica hydrogel, silicic acid, colloidal silica, tetra-alkyl orthosilicates (e.g. tetraethyl orthosilicate), and silica hydroxides. Sources useful herein for Ge include germanium oxide and germanium ethoxide.

Sources of elements selected for optional composition variable W include oxides, hydroxides, acetates, oxalates, ammonium salts and sulfates of the element(s) selected for W. Typical sources of aluminum oxide ($Al_2O_3$) when used in the reaction mixture include aluminates, alumina, and aluminum compounds such as $AlCl_3$, $Al_2(SO_4)_3$, aluminum hydroxide ($Al(OH)_3$), kaolin clays, and other zeolites. An example of the source of aluminum oxide is LZ-210 zeolite (a type of Y zeolite). Germanium, boron, gallium, titanium and iron can be added in forms corresponding to their aluminum and silicon counterparts.

As described herein above, for each embodiment described herein, the reaction mixture is formed using at least one active source of an element selected from Groups 1 and 2 of the Periodic Table (referred to herein as M). In one subembodiment, the reaction mixture is formed using an active source of an element from Group 1 of the Periodic Table. In another subembodiment, the reaction mixture is formed using an active source of sodium (Na). Any M-containing compound which is not detrimental to the crystallization process is suitable. Sources for such Groups 1 and 2 elements include oxides, hydroxides, nitrates, sulfates, halogenides, oxalates, citrates and acetates thereof.

The SDA dication is associated with anions ($X^-$) which may be any anion that is not detrimental to the formation of the NES-type zeolite. Representative anions include elements from Group 18 of the Periodic Table (e.g., fluoride, chloride, bromide and iodide), hydroxide, acetate, sulfate, tetrafluoroborate, carboxylate, and the like.

The dication SDAs of the present invention (represented by formulas (1) and (2) herein) can be synthesized by reacting a dihaloalkane (such as 1,4-dibromobutane and 1,5-dibromopentane) with dimethylcyclohexylamine.

For each embodiment described herein, the zeolite reaction mixture can be supplied by more than one source. Also, two or more reaction components can be provided by one source. For example, borosilicate zeolites may be synthesized by the method of the present invention using boron-containing beta zeolite as taught in U.S. Pat. No. 5,972,204, issued Oct. 26, 1999 to Corma et al.

The reaction mixture can be prepared either batch wise or continuously. Crystal size, morphology and crystallization time of the crystalline zeolite described herein may vary with the nature of the reaction mixture and the crystallization conditions.

Crystallization and Post-Synthesis Treatment

In practice, the zeolite is prepared by:

(a) preparing a reaction mixture as described herein above; and (b) maintaining the reaction mixture under crystallization conditions sufficient to form crystals of the zeolite.

The reaction mixture is maintained at an elevated temperature until the crystals of the zeolite are formed. The hydrothermal crystallization is usually conducted under pressure, and usually in an autoclave so that the reaction mixture is subject to autogenous pressure, at a temperature between 125° C. and 200° C.

The reaction mixture may be subjected to mild stirring or agitation during the crystallization step. It will be understood by a person skilled in the art that the zeolites described herein may contain impurities, such as amorphous materials, unit cells having framework topologies which do not coincide with the zeolite, and/or other impurities (e.g., organic hydrocarbons).

During the hydrothermal crystallization step, the zeolite crystals can be allowed to nucleate spontaneously from the reaction mixture. The use of crystals of the zeolite as seed material can be advantageous in decreasing the time necessary for complete crystallization to occur. In addition, seeding can lead to an increased purity of the product obtained by promoting the nucleation and/or formation of the zeolite over any undesired phases. When used as seeds, seed crystals are added in an amount between 1% and 10% of the weight of the source for compositional variable Y used in the reaction mixture.

Once the zeolite crystals have formed, the solid product is separated from the reaction mixture by standard mechanical separation techniques such as filtration. The crystals are water-washed and then dried to obtain the as-synthesized zeolite crystals. The drying step can be performed at atmospheric pressure or under vacuum.

The zeolite can be used as-synthesized, but typically will be thermally treated (calcined). The term "as-synthesized" refers to the zeolite in its form after crystallization, prior to removal of the SDA cation and/or M. The SDA can be removed by thermal treatment (e.g., calcination), preferably in an oxidative atmosphere (e.g., air, gas with an oxygen partial pressure of greater than 0 kPa) at a temperature readily determinable by one skilled in the art sufficient to remove the SDA from the zeolite. The SDA can also be removed by photolysis techniques (e.g. exposing the SDA-containing zeolite product to light or electromagnetic radiation that has a wavelength shorter than visible light under conditions sufficient to selectively remove the organic compound from the zeolite) as described in U.S. Pat. No. 6,960,327 to Navrotsky and Parikh, issued Nov. 1, 2005.

The zeolite can subsequently be calcined in steam, air or inert gas at temperatures ranging from about 200° C. to about 800° C. for periods of time ranging from 1 to 48 hours, or more. Usually, it is desirable to remove the alkali metal cation (if any) by ion exchange and replace it with hydrogen, ammonium, or any desired metal-ion.

Where the zeolite formed is an intermediate zeolite, the target zeolite can be achieved using post-synthesis techniques such as heteroatom lattice substitution techniques and acid leaching techniques.

The zeolite made from the process of the present invention can be formed into a wide variety of physical shapes. Generally speaking, the molecular sieve can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the zeolite can be extruded before drying, or, dried or partially dried and then extruded.

The zeolite can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. No. 4,910,006, issued May 20, 1990 to Zones et al., and U.S. Pat. No. 5,316,753, issued May 31, 1994 to Nakagawa.

Characterization of the Zeolite

Zeolites made by the process of the present invention have a composition, as-synthesized and in the anhydrous state, as described in Table 2 (in terms of mole ratios), wherein Y, W, Q and M are as described herein above:

TABLE 2

| | |
|---|---|
| $YO_2/W_2O_3$ | 20-200 |
| $Q/YO_2$ | 0.015-0.05 |
| $M/YO_2$ | 0-0.04 |

Zeolites made by the process of the present invention have a composition, after receiving secondary synthesis treatment, as described in Table 4 wherein the $YO_2/W_2O_3$ molar ratio is 20-∞.

Zeolites synthesized by the process of the present invention are characterized by their X-ray diffraction pattern. The X-ray diffraction pattern lines of Table 3 are representative of as-synthesized borosilicate NES-type zeolites made in accordance with this invention. Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation and from variations in the Y/W mole ratio from sample to sample. Calcination can also cause minor shifts in the X-ray diffraction pattern. Notwithstanding these minor perturbations, the basic crystal lattice structure remains unchanged.

TABLE 3

Characteristic Peaks for As-Synthesized Borosilicate NES-type Zeolites

| 2 Theta[a] | d-spacing (Angstroms) | Relative Integrated Intensity (%)[b] |
|---|---|---|
| 7.90 | 11.19 | S |
| 8.32 | 10.62 | W |
| 19.32 | 4.59 | S |
| 20.54 | 4.32 | VS |
| 22.42 | 3.96 | S |
| 22.81 | 3.90 | S |
| 23.97 | 3.71 | M |
| 26.08 | 3.41 | W |
| 27.27 | 3.27 | S |

[a]±0.20
[b]The X-ray patterns provided are based on a relative intensity scale in which the strongest line in the X-ray pattern is assigned a value of 100: W(weak) is less than 20; M(medium) is between 20 and 40; S(strong) is between 40 and 60; VS(very strong) is greater than 60.

The X-ray diffraction pattern lines of Table 4 are representative of as synthesized aluminosilicate NES-type zeolites made in accordance with this invention.

TABLE 4

Characteristic Peaks for As-Synthesized Aluminosilicate NES-type Zeolites

| 2 Theta[a] | d-spacing (Angstroms) | Relative Integrated Intensity (%)[b] |
|---|---|---|
| 7.89 | 11.19 | VS |
| 8.34 | 10.60 | M |
| 19.24 | 4.61 | W |
| 20.46 | 4.34 | VS |
| 22.32 | 3.98 | S |
| 22.66 | 3.92 | M |
| 23.81 | 3.73 | M |

TABLE 4-continued

Characteristic Peaks for
As-Synthesized Aluminosilicate NES-type Zeolites

| 2 Theta[a] | d-spacing (Angstroms) | Relative Integrated Intensity (%)[b] |
|---|---|---|
| 26.03 | 3.42 | M |
| 26.55 | 3.36 | M |
| 27.18 | 3.28 | M |
| 27.45 | 3.25 | M |

[a]±0.20
[b]The X-ray patterns provided are based on a relative intensity scale in which the strongest line in the X-ray pattern is assigned a value of 100: W(weak) is less than 20; M(medium) is between 20 and 40; S(strong) is between 40 and 60; VS(very strong) is greater than 60.

The X-ray diffraction pattern lines of Table 5 are representative of calcined borosilicate NES-type zeolites made in accordance with this invention.

TABLE 5

Characteristic Peaks for Calcined Borosilicate NES-type Zeolites

| 2 Theta[a] | d-spacing (Angstroms) | Relative Integrated Intensity (%)[b] |
|---|---|---|
| 8.02 | 11.01 | VS |
| 8.45 | 10.46 | S |
| 19.44 | 4.56 | S |
| 20.40 | 4.35 | M |
| 20.73 | 4.28 | S |
| 22.53 | 3.94 | S |
| 24.15 | 3.68 | W |
| 26.21 | 3.40 | W |
| 27.45 | 3.25 | M |

[a]±0.20
[b]The X-ray patterns provided are based on a relative intensity scale in which the strongest line in the X-ray pattern is assigned a value of 100: W(weak) is less than 20; M(medium) is between 20 and 40; S(strong) is between 40 and 60; VS(very strong) is greater than 60.

The X-ray diffraction pattern lines of Table 6 are representative of calcined aluminosilicate NES-type zeolites made in accordance with this invention.

TABLE 6

Characteristic Peaks for Calcined Aluminosilicate NES-type Zeolites

| 2 Theta[a] | d-spacing (Angstroms) | Relative Integrated Intensity (%)[b] |
|---|---|---|
| 8.03 | 11.00 | VS |
| 8.48 | 10.42 | S |
| 19.35 | 4.58 | S |
| 20.62 | 4.30 | VS |
| 22.44 | 3.96 | S |
| 22.76 | 3.90 | S |
| 24.01 | 3.70 | M |
| 26.15 | 3.40 | M |
| 26.85 | 3.32 | M |
| 27.34 | 3.26 | VS |

[a]±0.20
[b]The X-ray patterns provided are based on a relative intensity scale in which the strongest line in the X-ray pattern is assigned a value of 100: W(weak) is less than 20; M(medium) is between 20 and 40; S(strong) is between 40 and 60; VS(very strong) is greater than 60.

The Powder X-ray diffraction patterns presented herein were collected by standard techniques. The radiation was CuK-α radiation. The peak heights and the positions, as a function of 2θ where θ is the Bragg angle, were read from the relative intensities of the peaks, and d, the interplanar spacing in Angstroms corresponding to the recorded lines, can be calculated.

Synthesis of SDAs

EXAMPLE 1

Synthesis of
1,4-bis(N,N-dimethylcyclohexylammonium)butane
Dication 26.5 g dimethylcyclohexylamine (Aldrich Chemical Company) was added to 100 mL methanol. Then 20.0 g 1,4-dibromobutane was added to the solution and stirred for 5 minutes. The solution was then allowed to remain at room temperature for 72 hours. Thereafter, the solution was then heated at 60° C. for 4 hours. The methanol was then removed by rotoevaporation and then about 100 mL acetone was added to the residue and mixed until precipitation of a solid product occurred. The solids were then recovered by filtration and washed with ether. The solids were allowed to air-dry. 1H and 13C NMR showed the product to be pure 1,4-bis(N,N-dimethylcyclohexylammonium)butane within the limits of detection.

The dibromide salt was then ion-exchanged into the hydroxide form by dissolving the salts in water and adding a two-fold excess of AG-1-X8 hydroxide anion-exchange resin (Bio-Rad Laboratories, Inc.) and allowing the exchange to occur overnight. The resin was then removed by filtration and the resultant SDA solution was titrated with 0.100 N HCl to determine the hydroxide concentration.

EXAMPLE 2

Synthesis of
1,5-bis(N,N-dimethylcyclohexylammonium)pentane
Dication 26.5 g dimethylcyclohexylamine (Aldrich Chemical Company) was added to 100 mL methanol. Then 20.0 g 1,5-dibromopentane was added to the solution and stirred for 5 minutes. The solution was then allowed to remain at room temperature for 72 hours. Thereafter, the solution was then heated at 60° C. for 4 hours. The methanol was then removed by rotoevaporation and then about 100 mL acetone was added to the residue and mixed until precipitation of a solid product occurred. The solids were then recovered by filtration and washed with ether. The solids were allowed to air-dry. 1H and 13C NMR showed the product to be pure 1,5-bis(N,N-dimethylcyclohexylammonium)pentane within the limits of detection.

The dibromide salt was then ion-exchanged into the hydroxide form by dissolving the salts in water and adding a two-fold excess of AG-1-X8 hydroxide anion-exchange resin (Bio-Rad Laboratories, Inc.) and allowing the exchange to occur overnight. The resin was then removed by filtration and the resultant SDA solution was titrated with 0.100 N HCl to determine the hydroxide concentration.

Synthesis of Borosilicate Nu-87 Using
1,4-bis(N,N-dimethylcyclohexylammonium)butane
Dication

EXAMPLE 3

2.53 g of a hydroxide solution of 1,4-bis(N,N-dimethylcyclohexylammonium)butane ([OH⁻]=0.71 mmol/g) synthesized per Example 1, 0.72 g 1N sodium hydroxide, and 5.11 g deionized water were mixed together in a Teflon liner. Then, 0.036 g sodium borate decahydrate was dissolved into solution. Next, 0.54 g CAB-O-SIL M-5 fumed silica (Cabot Corporation) was added to the solution and mixed to create a uniform gel. The liner was then capped and placed within a Parr Steel autoclave reactor. The autoclave was then fixed in a rotating spit (43 rpm) within an oven heated at 160° C. for 8 days. The solid products were recovered from the cooled reactor by vacuum filtration and washed with copious quantities of water.

Figure 1:
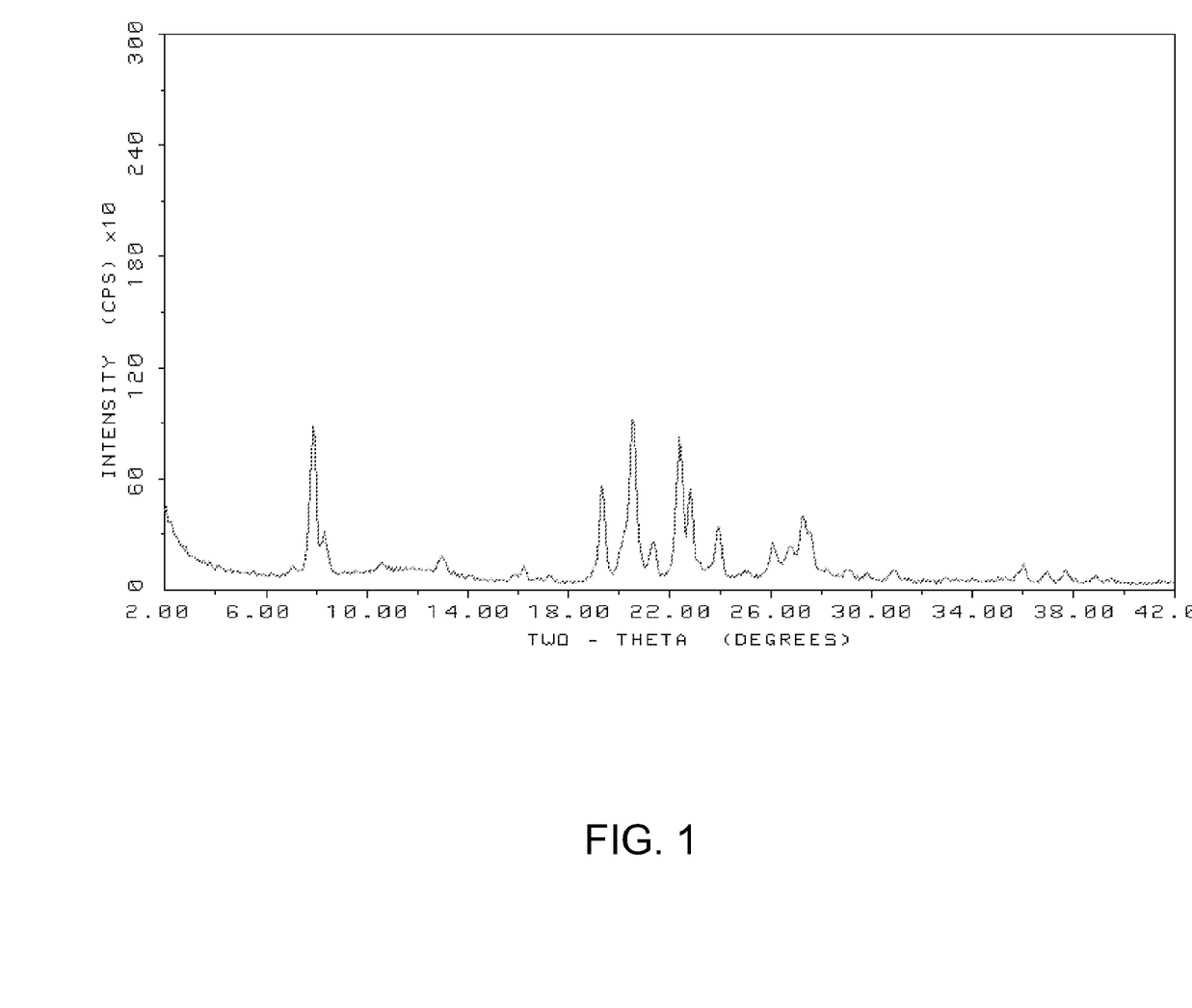
FIG. 1 shows the results of a powder x-ray diffraction (XRD) analysis of the as-synthesized zeolite prepared in Example 3.

The resulting zeolite product was analyzed by powder XRD. The resulting pattern is shown in FIG. 1 and indicates the material was pure Nu-87. Table 7 below shows the Powider X-ray diffraction lines for the resulting zeolite product.

TABLE 7

| 2 Theta[a] | d-spacing (Angstroms) | Relative Integrated Intensity (%) |
|---|---|---|
| 7.04 | 12.55 | 2 |
| 7.90 | 11.19 | 56 |
| 8.32 | 10.62 | 19 |
| 10.58 | 8.36 | 6 |
| 13.01 | 6.80 | 15 |
| 15.88 | 5.58 | 2 |
| 16.28 | 5.44 | 5 |
| 17.28 | 5.13 | 1 |
| 19.32 | 4.59 | 45 |
| 20.20 | 4.39 | 11 |
| 20.54 | 4.32 | 100 |
| 21.36 | 4.16 | 10 |
| 22.42 | 3.96 | 49 |
| 22.81 | 3.90 | 46 |
| 23.97 | 3.71 | 29 |
| 25.08 | 3.55 | 2 |
| 26.08 | 3.41 | 16 |
| 26.82 | 3.32 | 14 |
| 27.27 | 3.27 | 59 |
| 27.57 | 3.23 | 6 |
| 28.20 | 3.16 | 2 |
| 29.10 | 3.07 | 4 |
| 29.86 | 2.99 | 3 |
| 30.86 | 2.90 | 8 |
| 35.26 | 2.54 | 1 |
| 36.05 | 2.49 | 10 |
| 36.89 | 2.43 | 4 |
| 37.70 | 2.38 | 6 |
| 38.94 | 2.31 | 3 |
| 39.56 | 2.28 | 4 |

[a]±0.20

Figure 2:
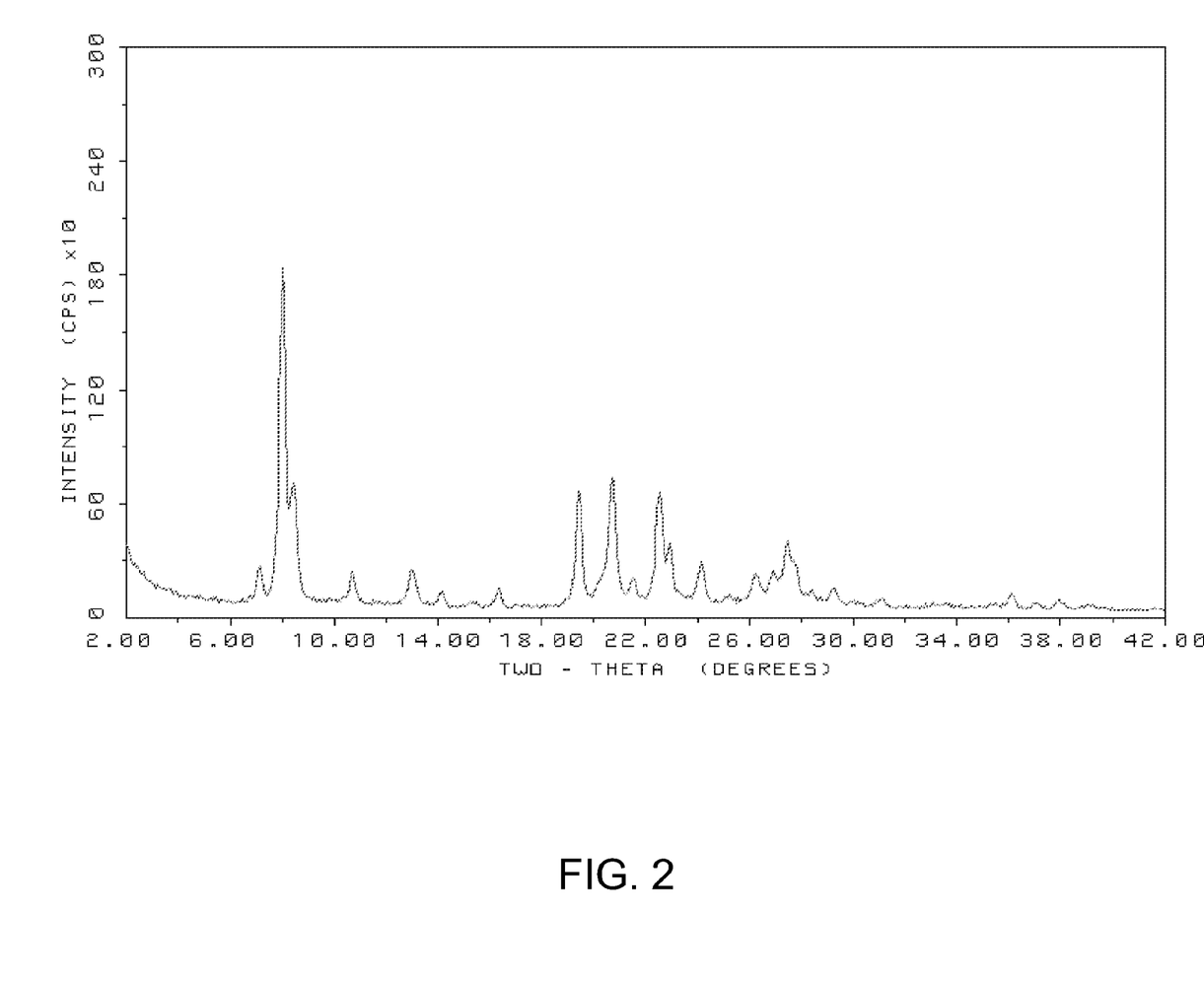
FIG. 2 shows the results of a powder XRD analysis of the calcined zeolite prepared in Example 3.

The resulting zeolite product was calcined inside a muffle furnace under a flow of 2% oxygen/98% nitrogen heated to 595° C. at a rate of 1° C./min and held at 595° C. for five hours and then analyzed by powder XRD. The powder XRD pattern of the calcined zeolite is shown in FIG. 2. Table 8 below shows the Powder X-ray diffraction lines for the calcined zeolite product.

TABLE 8

| 2 Theta[a] | d-spacing (Angstroms) | Relative Integrated Intensity (%) |
|---|---|---|
| 7.15 | 12.35 | 9 |
| 8.02 | 11.01 | 100 |
| 8.45 | 10.46 | 56 |
| 10.74 | 8.23 | 10 |
| 13.05 | 6.78 | 13 |
| 14.17 | 6.24 | 4 |
| 16.39 | 5.41 | 6 |
| 17.54 | 5.05 | 1 |
| 19.44 | 4.56 | 44 |
| 20.40 | 4.35 | 22 |
| 20.73 | 4.28 | 40 |
| 21.49 | 4.13 | 7 |
| 22.14 | 4.01 | 0 |
| 22.53 | 3.94 | 48 |
| 22.92 | 3.88 | 11 |
| 23.28 | 3.82 | 3 |
| 24.15 | 3.68 | 13 |
| 25.15 | 3.54 | 2 |
| 26.21 | 3.40 | 18 |
| 26.88 | 3.31 | 11 |
| 27.45 | 3.25 | 32 |
| 27.78 | 3.21 | 7 |
| 28.39 | 3.14 | 7 |
| 29.23 | 3.05 | 3 |
| 30.01 | 2.97 | 1 |
| 31.14 | 2.87 | 2 |
| 33.07 | 2.71 | 1 |
| 33.57 | 2.67 | 2 |
| 33.93 | 2.64 | 1 |
| 35.53 | 2.52 | 3 |
| 36.12 | 2.49 | 5 |
| 37.12 | 2.42 | 1 |
| 37.93 | 2.37 | 3 |
| 39.02 | 2.31 | 3 |

[a]±0.20

Synthesis of Aluminosilicate Nu-87 Using 1,4-bis(N,N-dimethylcyclohexylammonium)butane Dication

EXAMPLE 4

1.81 g of a hydroxide solution of 1,4-bis(N,N-dimethylcyclohexylammonium)butane ([OH⁻]=0.71 mmol/g) synthesized per Example 1, 0.86 g 1N sodium hydroxide, and 3.09 g deionized water were mixed together in a Teflon liner. Next, 0.48 g CAB-O-SIL M-5 fumed silica (Cabot Corporation) and 0.15 g LZY-52 zeolite Y were added the solution and mixed to create a uniform gel. The liner was then capped and placed within a Parr Steel autoclave reactor. The autoclave was then fixed in a rotating spit (43 rpm) within an oven heated at 160° C. for 8 days. The solid products were recovered from the cooled reactor by vacuum filtration and washed with copious quantities of water.

Figure 3:
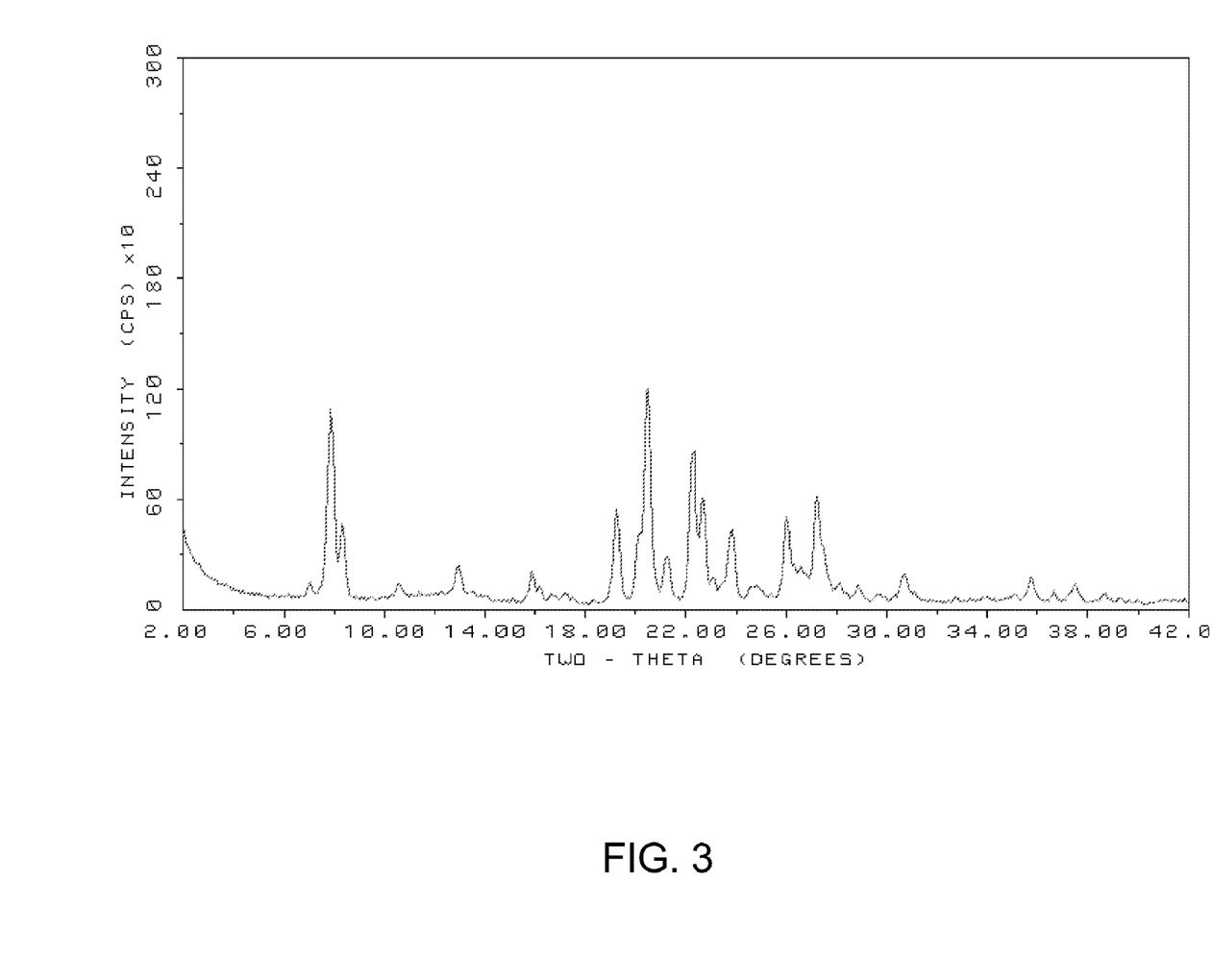
FIG. 3 shows the results of a powder XRD analysis of the as-synthesized zeolite prepared in Example 4.

The resulting zeolite product was analyzed by powder XRD. The resulting pattern is shown in FIG. 3 and indicates the material was pure Nu-87. Table 9 below shows the Powder X-ray diffraction lines for the resulting zeolite product.

TABLE 9

| 2 Theta[a] | d-spacing (Angstroms) | Relative Integrated Intensity (%) |
|---|---|---|
| 7.05 | 12.53 | 3 |
| 7.89 | 11.19 | 73 |
| 8.34 | 10.60 | 24 |
| 10.56 | 8.37 | 7 |
| 12.99 | 6.81 | 17 |
| 13.57 | 6.52 | 2 |
| 14.08 | 6.29 | 2 |
| 15.89 | 5.57 | 7 |
| 16.20 | 5.47 | 6 |
| 16.72 | 5.30 | 2 |
| 17.20 | 5.15 | 5 |
| 19.24 | 4.61 | 17 |
| 20.16 | 4.40 | 12 |
| 20.46 | 4.34 | 100 |
| 21.25 | 4.18 | 13 |
| 22.32 | 3.98 | 56 |

TABLE 9-continued

| 2 Theta[a] | d-spacing (Angstroms) | Relative Integrated Intensity (%) |
|---|---|---|
| 22.66 | 3.92 | 34 |
| 23.07 | 3.85 | 7 |
| 23.43 | 3.79 | 3 |
| 23.81 | 3.73 | 30 |
| 24.57 | 3.62 | 4 |
| 24.82 | 3.58 | 5 |
| 25.43 | 3.50 | 1 |
| 26.03 | 3.42 | 26 |
| 26.29 | 3.39 | 11 |
| 26.55 | 3.35 | 26 |
| 27.18 | 3.28 | 34 |
| 27.45 | 3.25 | 21 |
| 28.09 | 3.17 | 6 |
| 28.86 | 3.09 | 5 |
| 29.71 | 3.00 | 4 |
| 30.64 | 2.92 | 23 |
| 31.13 | 2.87 | 0.4 |
| 32.68 | 2.74 | 2 |
| 34.01 | 2.63 | 3 |
| 35.11 | 2.55 | 4 |
| 35.73 | 2.51 | 10 |
| 36.68 | 2.45 | 3 |
| 37.51 | 2.40 | 9 |
| 38.64 | 2.33 | 4 |
| 39.31 | 2.29 | 1 |
| 40.98 | 2.20 | 4 |

[a]±0.20

Figure 4:
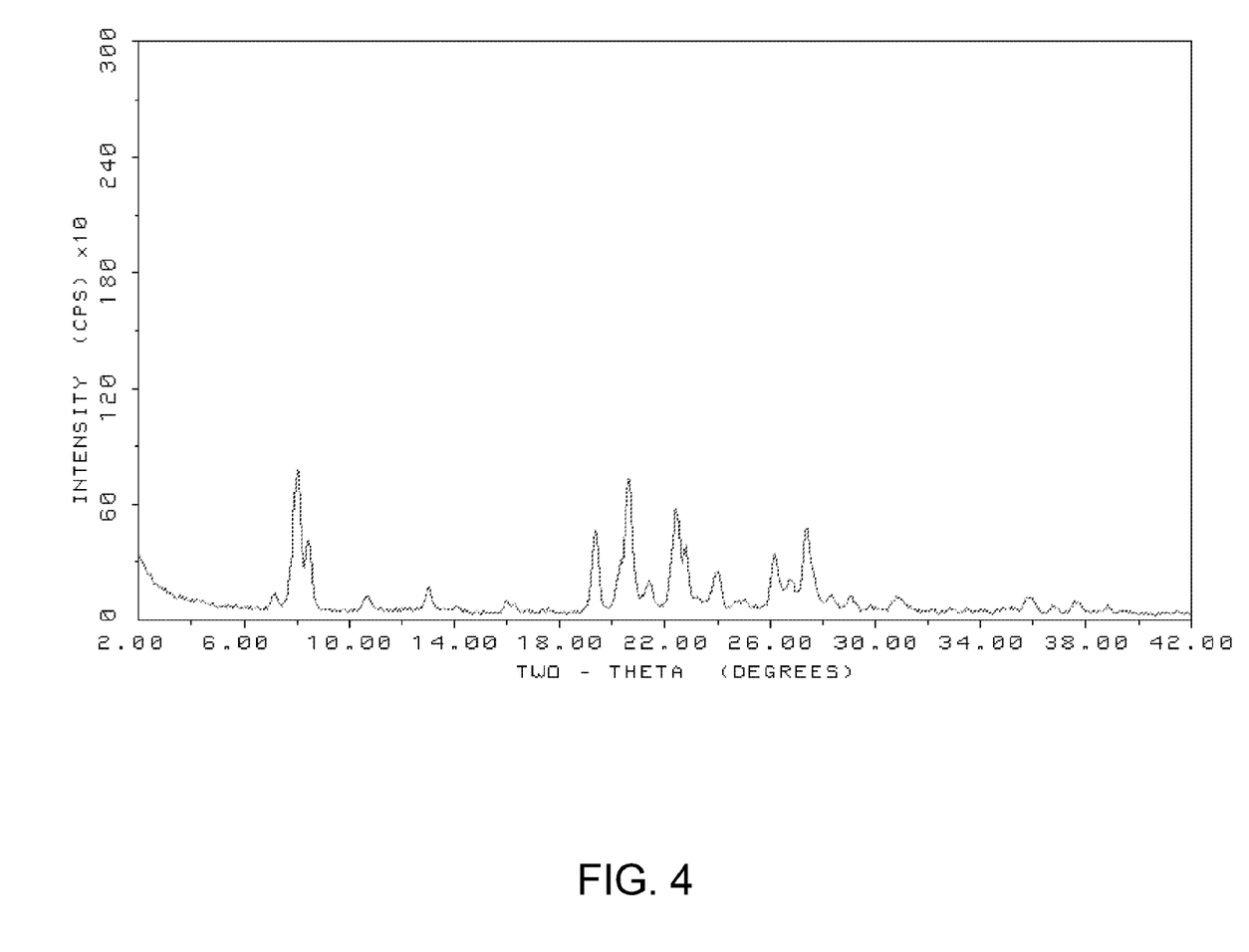
FIG. 4 shows the results of a powder XRD analysis of the calcined zeolite prepared in Example 4.

The resulting zeolite product was calcined inside a muffle furnace under a flow of 2% oxygen/98% nitrogen heated to 595° C. at a rate of 1° C./min and held at 595° C. for five hours and then analyzed by powder XRD. The powder XRD pattern of the calcined zeolite is shown in FIG. 4. Table 10 below shows the Powder X-ray diffraction lines for the calcined zeolite product.

TABLE 10

| 2 Theta[a] | d-spacing (Angstroms) | Relative Integrated Intensity (%) |
|---|---|---|
| 7.15 | 12.35 | 6 |
| 8.03 | 11.00 | 87 |
| 8.48 | 10.42 | 41 |
| 10.71 | 8.25 | 10 |
| 13.04 | 6.78 | 13 |
| 14.08 | 6.29 | 1 |
| 15.98 | 5.54 | 7 |
| 16.27 | 5.44 | 3 |
| 19.35 | 4.58 | 42 |
| 20.33 | 4.37 | 10 |
| 20.62 | 4.30 | 100 |
| 21.38 | 4.15 | 12 |
| 22.44 | 3.96 | 52 |
| 22.76 | 3.90 | 42 |
| 24.01 | 3.70 | 29 |
| 24.82 | 3.59 | 6 |
| 26.15 | 3.40 | 30 |
| 26.85 | 3.32 | 22 |
| 27.34 | 3.26 | 68 |
| 28.26 | 3.16 | 5 |
| 29.08 | 3.07 | 6 |
| 30.79 | 2.90 | 11 |
| 35.09 | 2.56 | 3 |
| 35.83 | 2.50 | 10 |
| 36.78 | 2.44 | 3 |
| 37.70 | 2.38 | 6 |
| 38.90 | 2.31 | 3 |

[a]±0.20

EXAMPLE 5

3.62 g of a hydroxide solution of 1,4-bis(N,N-dimethylcyclohexylammonium)butane ([OH$^-$]=0.71 mmol/g), 1.72 g 1N sodium hydroxide, and 6.18 g deionized water were mixed together in a Teflon liner. Next 0.96 g CAB-O-SIL M-5 fumed silica (Cabot Corporation) and 0.30 g LZY-52 zeolite Y were added to the solution and mixed to create a uniform gel. Then, 0.04 g of zeolite seeds (from Example 4) was mixed into the gel. The liner was then capped and placed within a Parr Steel autoclave reactor. The autoclave was then fixed in a rotating spit (43 rpm) within an oven heated at 160° C. for 5 days. The solid products were recovered from the cooled reactor by vacuum filtration and washed with copious quantities of water.

Figure 5:
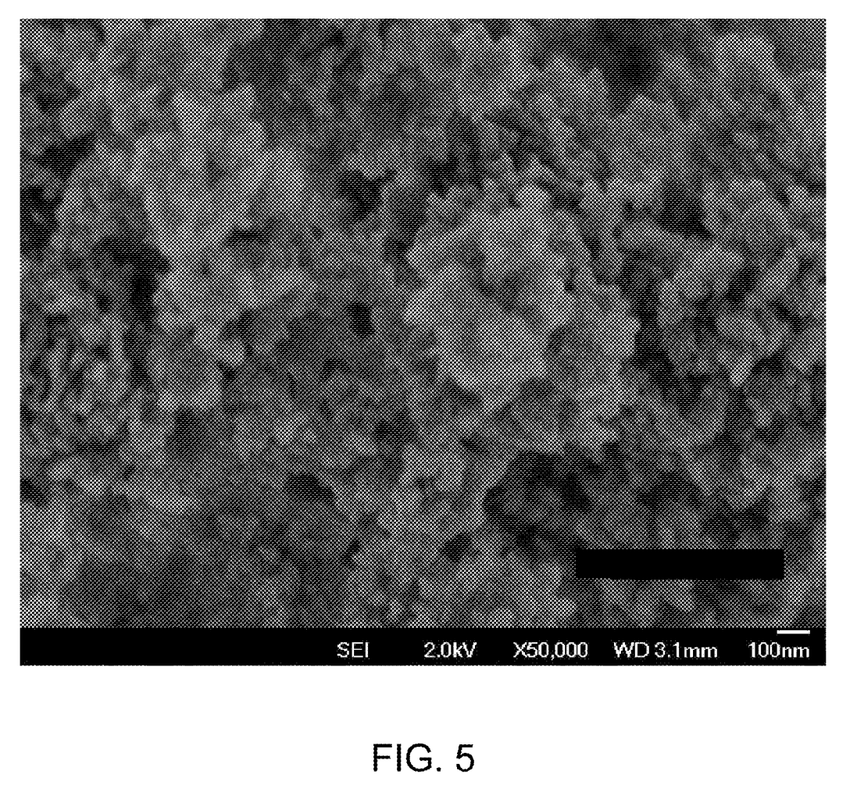
FIG. 5 shows the results of a scanning electron microscopy (SEM) analysis of the zeolite prepared in Example 5.

The resulting zeolite product was analyzed by powder XRD and SEM. Powder XRD indicated the sample was pure Nu-87. The SEM image is shown in FIG. 5 and indicates the individual crystallites are less than 50 nm in size.

EXAMPLE 6

3.62 g of a hydroxide solution of 1,4-bis(N,N-dimethylcyclohexylammonium)butane ([OH—]=0.71 mmol/g), 1.72 g 1N sodium hydroxide, and 6.18 g deionized water were mixed together in a Teflon liner. Next 1.11 g CAB-O-SIL M-5 fumed silica (Cabot Corporation) and 0.15 g LZY-52 zeolite Y were added to the solution and mixed to create a uniform gel. Then 0.04 g of zeolite seeds (from Example 4) was mixed into the gel. The liner was then capped and placed within a Parr Steel autoclave reactor. The autoclave was then fixed in a rotating spit (43 rpm) within an oven heated at 160° C. for 12 days. The solid products were recovered from the cooled reactor by vacuum filtration and washed with copious quantities of water. The powder X-ray diffraction pattern indicated the material was Nu-87 with trace zeolite Y impurity.

Synthesis of Aluminosilicate Nu-87 Using 1,5-bis(N,N-dimethylcyclohexylammonium)pentane Dication

EXAMPLE 7

2.36 g of a hydroxide solution of 1,5-bis(N,N-dimethylcyclohexylammonium)pentane ([OH$^-$]=0.54 mmol/g) synthesized per Example 2, 0.86 g 1N sodium hydroxides and 2.54 g deionized water were mixed together in a Teflon liner. Next, 0.48 g CAB-O-SIL M-5 fumed silica (Cabot Corporation) and 0.15 g LZY-52 zeolite Y were added to the solution and mixed to create a uniform gel. The liner was then capped and placed within a Parr Steel autoclave reactor. The autoclave was then fixed in a rotating spite (43 rpm) within an oven heated at 160° C. for 14 days. The solid products were recovered from the cooled reactor by vacuum filtration and washed with copious quantities of water.

The resulting zeolite product was analyzed by powder XRD. The powder X-ray diffraction pattern indicated the material was pure Nu-87.

EXAMPLE 8

3.22 g of a hydroxide solution of 1,5 bis(N,N-dimethylcyclohexylammonium)pentane ([OH$^-$]=0.54 mmol/g) synthesized per Example 2, 150 g 1N sodium hydroxide, and 1.04 g deionized water were mixed together in a Teflon liner. Then, 0.40 g CAB-O-SIL M-5 fumed silica (Cabot Corporation) and 0.125 g LZY-52 zeolite Y were added to the solution and mixed to create a uniform gel. The liner was then capped and placed within a Parr Steel autoclave reactor. The autoclave was then fixed in a rotating spit (43 rpm) within an oven heated at 160° C. for 23 days. The solid products were recovered from the cooled reactor by vacuum filtration and washed with copious quantities of water. The resulting zeolite product was analyzed by powder XRD. The powder X-ray diffraction indicated the material was zeolite beta with minor quartz.

What is claimed is:

1. A method for preparing a NES-type zeolite, comprising:
   (a) preparing a reaction mixture comprising (1) at least one active source of an oxide selected from the group consisting of oxides of silicon, germanium, and a mixture thereof; (2) at least one active source of an oxide selected from the group consisting of oxides of aluminum, boron, iron, gallium, and mixtures thereof; (3) at least one active source of an element selected from Groups 1 and 2 of the Periodic Table; (4) hydroxide ions; (5) a structure directing agent selected from the group consisting of 1,4-bis(N,N-dimethylcyclohexylammonium)butane dications and 1,5-bis(N,N-dimethylcyclohexylammonium)pentane dications; and (6) water; and
   (b) maintaining the reaction mixture under conditions sufficient to form crystals of the NES-type zeolite.

2. The method according to claim 1, wherein the reaction mixture has the following molar ratios:

| | |
|---|---|
| $YO_2/W_2O_3$ | 8-200 |
| $M/YO_2$ | 0.05-0.50 |
| $Q/YO_2$ | 0.05-0.50 |
| $OH/YO_2$ | 0.10-1.0 |
| $H_2O/YO_2$ | 10-200 | wherein:
   (1) Y is selected from the group consisting of silicon, germanium, and a mixture thereof;
   (2) W is selected from the group consisting of oxides of aluminum, boron, iron, gallium, and mixtures thereof;
   (3) M is the element selected from Groups 1 and 2 of the Periodic Table; and
   (4) Q is the structure directing agent.

3. The method according to claim 2, wherein the reaction mixture has the following molar ratios:

| | |
|---|---|
| $YO_2/W_2O_3$ | 10-80 |
| $M/YO_2$ | 0.05-0.30 |
| $Q/YO_2$ | 0.10-0.25 |
| $OH/YO_2$ | 0.20-0.40 |
| $H_2O/YO_2$ | 20-60. |

4. The method according to claim 2, wherein Y is silicon and W is aluminum.

5. The method according to claim 4, wherein the structure directing agent is a 1,4-bis(N,N-dimethylcyclohexylammonium)butane dications.

6. The method according to claim 4, wherein the structure directing agent is a 1,5-bis(N,N-dimethylcyclohexylammonium)pentane dications.

7. The method according to claim 2, wherein Y is silicon and W is boron.

8. The method according to claim 7, wherein the structure directing agent is a 1,4-bis(N,N-dimethylcyclohexylammonium)butane dications.

9. The method according to claim 1, wherein the structure directing agent is a 1,4-bis(N,N-dimethylcyclohexylammonium)butane dications.

10. The method according to claim 1, wherein the structure directing agent is a 1,5-bis(N,N-dimethylcyclohexylammonium)pentane dications.

* * * * *